(12) United States Patent
Heismann

(10) Patent No.: US 6,381,881 B1
(45) Date of Patent: May 7, 2002

(54) ENGINE COVER FOR A SNOW THROWER

(75) Inventor: Richard A. Heismann, Jackson, TN (US)

(73) Assignee: Murray, Inc., Brentwood, TN (US)

( * ) Notice: Subject to any disclaimer, the term of this patent is extended or adjusted under 35 U.S.C. 154(b) by 0 days.

(21) Appl. No.: 09/605,722

(22) Filed: Jun. 27, 2000

Related U.S. Application Data

(60) Provisional application No. 60/148,217, filed on Aug. 12, 1999.

(51) Int. Cl.[7] .................................................. E01H 5/00
(52) U.S. Cl. ...................................... 37/260; 123/198 E
(58) Field of Search .......................... 37/244, 259, 260, 37/266; 56/17.5, 12.8, 320.1, 320.2; 123/198 E, 41.7; 180/54.1

(56) References Cited

U.S. PATENT DOCUMENTS

| | | | | |
|---|---|---|---|---|
| 4,211,058 A | * | 7/1980 | Larsen | 56/17.5 |
| 4,294,027 A | * | 10/1981 | Edwards | 37/244 |
| 4,995,356 A | * | 2/1991 | Kronich | 123/198 E |
| 5,421,297 A | * | 6/1995 | Tamba et al. | 123/193.5 |
| 5,787,693 A | * | 8/1998 | Dyke | 56/11.9 |

* cited by examiner

*Primary Examiner*—Robert E. Pezzuto
(74) *Attorney, Agent, or Firm*—Kevin E. Joyce

(57) ABSTRACT

A snow thrower engine cover is provided with spaced interior walls to define a first space for receiving air used to cool the engine, a second space for retaining air heated by the engine's exhaust and a third space between the walls for restricting heat transfer from the second space to the interior wall which defines the first space.

7 Claims, 3 Drawing Sheets

ENGINE COVER FOR A SNOW THROWER

This application claims the benefit of U.S. Provisional Application No. 60/148,217, filed Aug. 12, 1999.

BACKGROUND OF THE INVENTION

1. Field of the Invention

The present invention relates to an engine cover for a snow thrower which is provided with an internal barrier arrangement for preventing snow contained in the engine's air intake from reaching the engine's carburetor area and for retaining engine exhaust heat used to supply the carburetor with warm air.

2. Prior Art

Engines used in snow thrower applications typically include an engine cover to protect the engine from the elements. If exposed to snow and moisture, the engine's operation can be adversely affected.

Additionally, a snow thrower normally operates in a cold environment. To improve the efficiency of the engine it is desirable to supply the engine with air warmed by the engine and its exhaust.

Covers which typically are used to protect a snow thrower engine allow ambient air to enter beneath the cover to cool the engine. Such air often contains snow which, if melted proximate the carburetor area of the engine, can cause malfunction.

SUMMARY OF THE INVENTION

The present invention provides an improved cover for a snow thrower engine which contains interior walls which define distinct spaces within the cover. A first space defined by a first wall receives cooling air for the engine, but that wall prevents snow carried in the cooling air from reaching the engine's carburetor. A second space defined by a second wall collects air heated by the exhaust muffler and supplied to the carburetor. The first and second walls are separated from one another to define a third space within the engine cover which restricts heat from the air within the second space from reaching the first wall and causing snow carried by the cooling air to turn to slush build-up thereby reducing the flow of cooling air to the engine.

BRIEF DESCRIPTION OF THE DRAWINGS

The invention will be described in greater detail with respect to the accompanying drawings, wherein.

DETAILED DESCRIPTION OF A PREFERRED EMBODIMENT OF THE INVENTION

Figure 1:
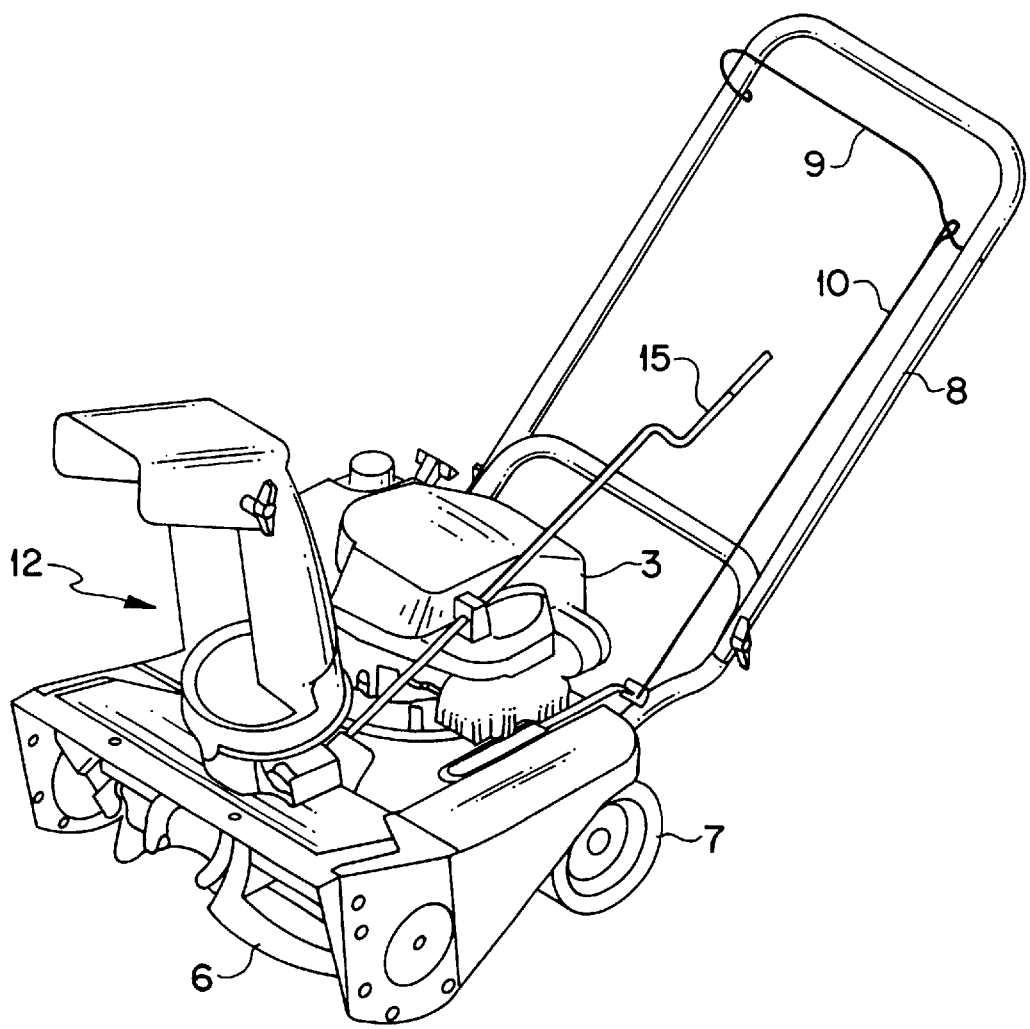
FIG. 1 is a perspective view of a snow thrower containing an engine cover according to the invention.

Referring to FIG. 1, a housing-supported engine located beneath a cover 3 is provided with a vertical output drive shaft (not shown) which passes through the upper surface of the housing. The output shaft is connected to an auger 6, supported within a forward portion of the housing, by a drive connection (not shown). The rear portion of the housing is supported by wheels 7. A handle 8 extends rearwardly of the housing. A control bar 9 is pivotally connected to the upper portion of handle 8 and is capable of being actuated by an operator. The control bar 9 is connected by a cable 10 to the drive connection between the engine's output drive shaft and auger 6. During operation of the engine, the operator selectively actuates the control bar 9 to complete the drive connection between the engine and auger 6 whereby snow is moved by the auger and is discharged from the housing through a discharge port provided in the housing above the central portion of auger 6. An adjustable discharge chute 12 is joined to the port to direct snow thrown by auger 6. A control rod 15 extends from one of its ends, positioned adjacent to handle 8, to a worm gear (not shown) which is joined to the rod's opposite end. The worm gear is positioned in operative relationship with chute 12 to cause the chute to rotate about a vertical axis in response to actuation of control rod 15 to thereby control the direction of snow discharged from the snow thrower as well as the distance the snow is thrown.

The engine illustrated in FIG. 1 is of a conventional air-cooled type which includes a carburetor, an exhaust muffler and a starter impeller. The engine cover, which now will be described in detail, is intended to protect the engine from the elements without adversely affecting the engine's operation.

Figure 2:
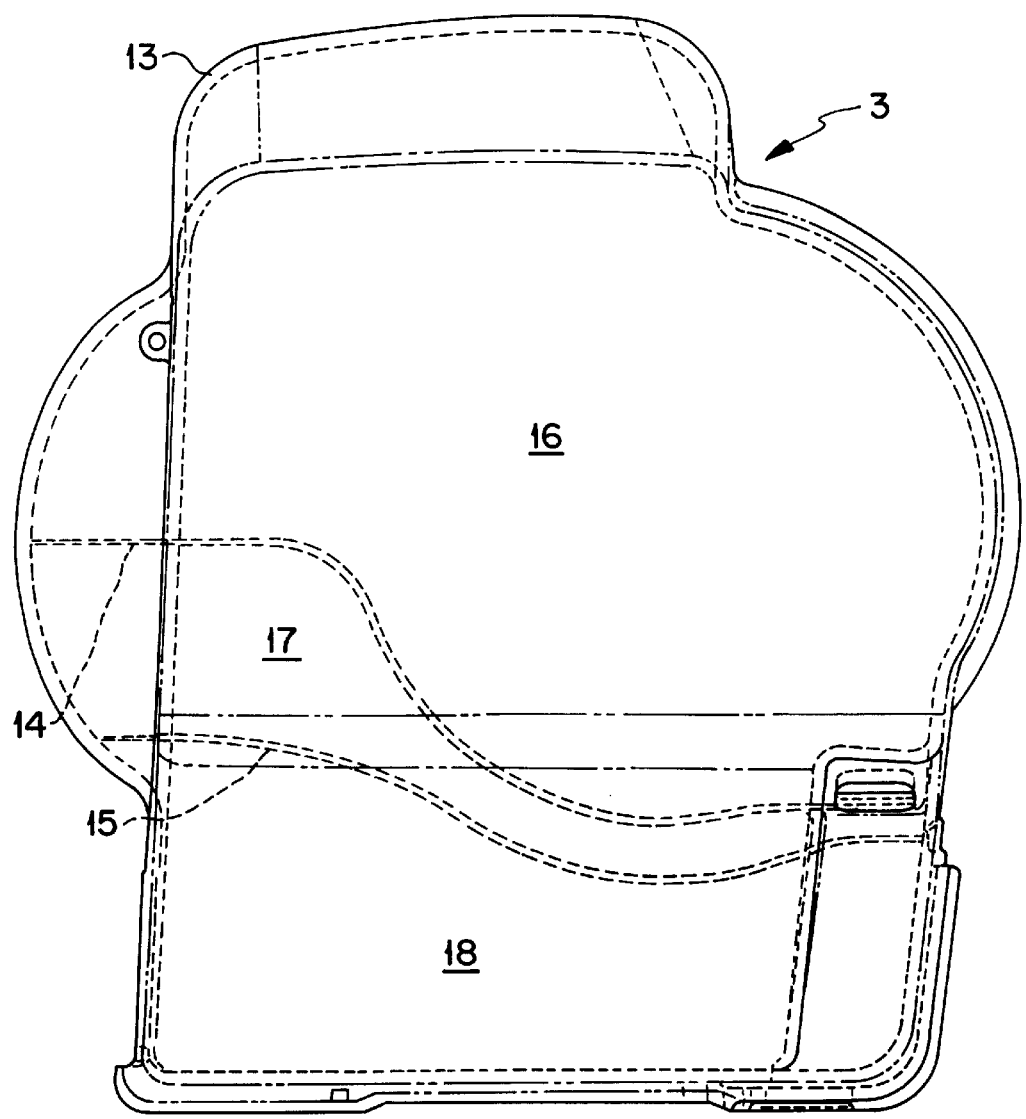
FIG. 2 is a top plan view of the engine cover shown in FIG. 1.
Figure 3:
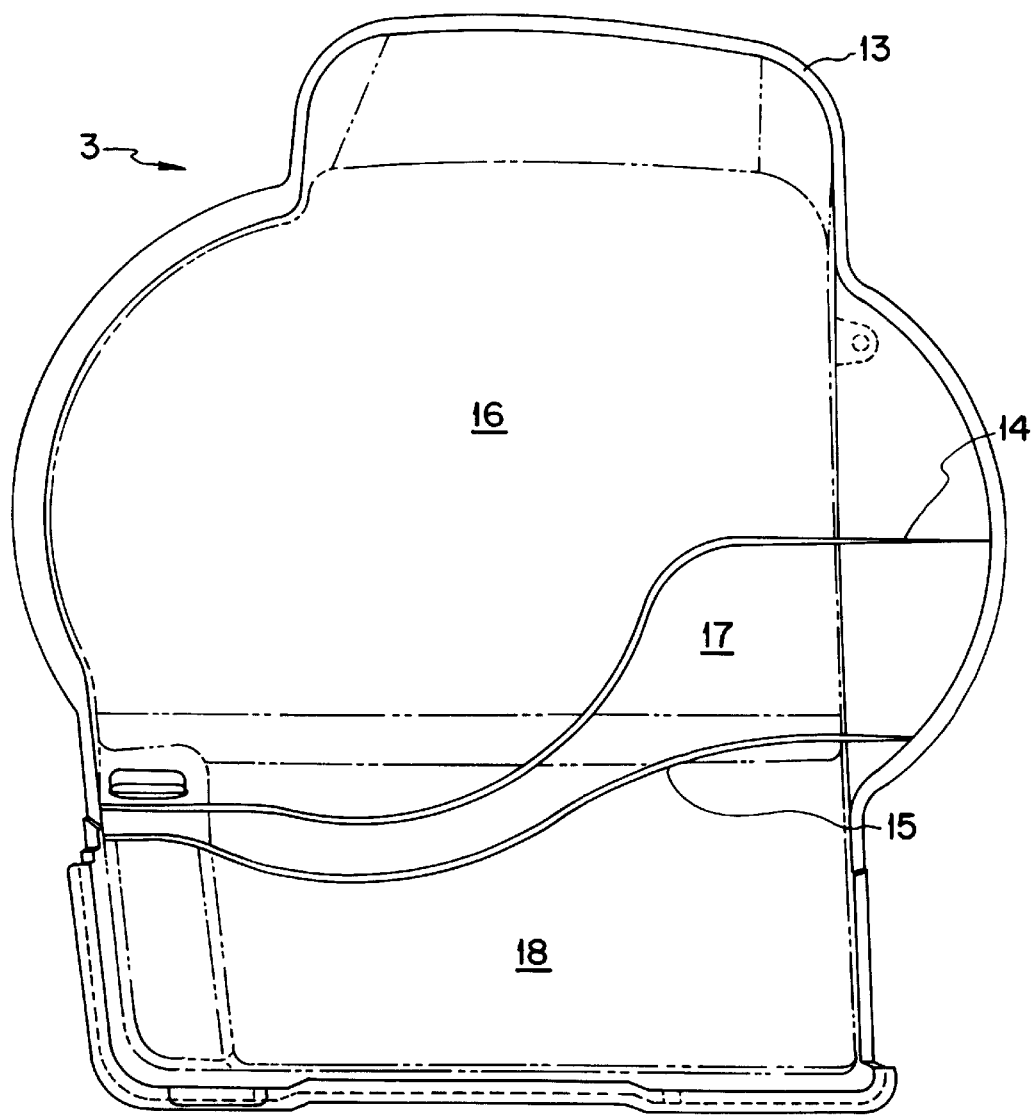
FIG. 3 is a bottom plan view thereof.

Referring to FIGS. 2 and 3, details of the cover 3 will be described. Preferably the cover is a molded plastic piece. The forward portion of the cover includes a hood 13 formed to permit air to be introduced within the cover to assist in cooling the engine. Alternatively, instead of a hood portion 13 as illustrated, cover 3 can be provided at its frontal portion with louvers or other types of openings to permit air to enter the space between the cover and the engine.

A pair of spaced walls 14 and 15 extend between opposite sides of cover 3. These walls are formed integrally with the cover and are shaped at their bottom edges to substantially conform with the contour of the engine being covered so as to serve as barrier walls, as hereinafter will be described.

Wall 14 is positioned to define a first space 16 within cover 3 between hood 13 and the wall. This space overlies the customary starter impeller portion of the type of engine typically employed in a snow thrower. Wall 15 is spaced relative to wall 14 so as to define a dead space 17 therebetween, wall 15 being located between wall 14 and the engine's exhaust and carburetor. On the opposite side of wall 15 from wall 14, a further space 18 is defined by wall 15 and the rear portion of cover 3 which retains air heated by engine exhaust for use in supplying warm air to the carburetor.

During normal usage of a snow thrower, cooling air directed to the engine contains snow which can melt within the engine's cover and can affect the engine's operation. The present cover 3 overcomes such problems in that wall 14 prevents snow in the cooling air within the cover from reaching the engine's carburetor. Instead, snow within space 16 merely drops harmlessly to be melted or evaporated on the engine parts below without affecting the engine's operation. The spacing of walls 14 and 15 to form the dead space 17 prevents wall 14 from being heated to the point where snow accumulates as slush within space 16 thereby reducing the cooling air intake within cover 3. Additionally, wall 15 retains hot air within space 18 to permit it to be used to provide warm air to the carburetor. This prevents the carburetor from freezing-up during operation of the snow thrower.

What is claimed is:

1. A cover for a snow thrower engine of the type having a carburetor, an exhaust and a starter impeller, said cover having an exterior wall for enclosing at least a portion of the engine and further including:

a first vertical interior wall extending between opposite sides of the cover and defining a first space within the cover for receiving ambient air to cool the engine; and a second vertical interior wall spaced from the first interior wall and extending between opposite sides of the cover to define a second space between the first and second interior walls and a third space between the second interior wall and the exterior wall of the cover, said third space containing air heated by the exhaust.

2. A cover for a snow thrower engine according to claim 1, wherein said first and second interior walls have bottom edges which substantially conform with the contour of the engine.

3. A cover for a snow thrower according to claim 1, wherein said first and second walls are sufficiently spaced so as to restrict heat transfer from within the third space to the first wall.

4. A cover for a snow thrower according to claim 3, wherein said first and second interior walls have bottom edges which substantially conform with the contour of the engine.

5. A cover for a snow thrower according to claim 1, wherein said first space overlies the starter impeller.

6. A cover for a snow thrower according to claim 5, wherein said first and second walls are sufficiently spaced so as to restrict heat transfer from within the third space to the first wall.

7. A cover for a snow thrower according to claim 6, wherein said first and second interior walls have bottom edges which substantially conform with the contour of the engine.

* * * * *